United States Patent [19]

Hunkeler et al.

[11] 3,821,867

[45] July 2, 1974

[54] APPARATUS FOR LOADING, UNLOADING AND HOLDING A WORKPIECE RELATIVE TO A MACHINE

[75] Inventors: Ernst J. Hunkeler, Fairport; Philip F. White, Victor, both of N.Y.

[73] Assignee: The Gleason Works, Rochester, N.Y.

[22] Filed: Aug. 14, 1972

[21] Appl. No.: 280,367

[52] U.S. Cl. ............... 51/215 R, 51/237, 51/277, 269/55
[51] Int. Cl. ............................... B24b 41/06
[58] Field of Search ....... 51/215 R, 215 H, 215 CR, 51/237, 277; 269/55

[56] References Cited
UNITED STATES PATENTS

| | | | |
|---|---|---|---|
| 2,840,892 | 7/1958 | Erdmann | 51/215 R |
| 2,850,850 | 9/1958 | Davis | 51/215 H X |
| 2,956,453 | 10/1960 | Frankenfield | 51/215 H X |
| 3,001,334 | 9/1961 | Giusti | 51/215 R X |
| 3,665,656 | 5/1972 | Newsome | 51/215 H |

Primary Examiner—Harold D. Whitehead
Attorney, Agent, or Firm—Ralph E. Harper

[57] ABSTRACT

Apparatus for handling a workpiece includes a holding unit carried by a machine for receiving and holding the workpiece in a precisely located position relative to grinding, milling, or other operations to be performed on the workpiece. A loading and unloading device is secured to the holding unit for receiving a workpiece externally of the holding unit and for advancing the workpiece into the confines of the holding unit along a first axis of movement. Once the workpiece is placed within the holding unit, a placement means functions to move the workpiece along a second axis of movement away from a supporting surface of the loading means and to a final placement position where the workpiece can receive a machining operation. The apparatus is especially useful for handling rotary engine housings during grinding or milling of rotor cavities in the housings.

12 Claims, 5 Drawing Figures

APPARATUS FOR LOADING, UNLOADING AND HOLDING A WORKPIECE RELATIVE TO A MACHINE

BACKGROUND OF INVENTION

The present invention is directed to precision handling of a workpiece for loading, unloading, and holding of a workpiece relative to a machine which performs a machining operation thereon. The invention is especially useful for solving problems associated with the handling of rotary engine ("Wankel") blocks which must be carefully handled and precisely positioned for grinding and milling of trochoidal shaped cavities therein for receiving rotor elements in final assembly of such engines.

The rotary combustion engine is being considered as a viable alternative to the reciprocating piston type of engine, and various types of machining equipment have been designed for forming the various components which must be assembled together in the rotary combustion engine. Rotary combustion engines under present consideration include those having unusual geometric forms for their combustion chambers in which a rotor is mounted for operation. Such engines include the so-called Wankel engine which is characterized by its requirement of a trochoidal-shaped cavity for receiving a delta-shaped rotor.

Manufacture of engines of the type under consideration, and especially those of the Wankel type, requires careful and precision handling of component parts making up the assembled engine structure. It is known to provide for machinery which generates a trochoidal cavity shape in an engine block by establishing certain relative movements between the engine block and grinding or milling tools carried by the machine. The present invention is concerned with improvements in machines of the type in which the engine block is mounted in a precisely located position for receiving a milling or grinding operation from tools of the machine as the engine block itself is rotated about an axis passing through the cavity shape to be formed.

BRIEF SUMMARY OF INVENTION

It has been found that workpieces of the type contemplated herein (e.g., rotary combustion engines housings) must be carefully handled and fully supported during certain machining operations in order to achieve precision standards of grinding or cutting of trochoidal cavity shapes within the workpiece. The presents a problem for mass production manufacture of such engines inasmuch as the workpieces must be handled in automatic, or semi-automatic, assembly line procedures which advance each workpiece into and out of a machining zone. During loading, unloading and holding of the workpiece, it is important to provide for a full and evenly distributed support of the workpiece to prevent any unwanted distortion of deflection of the body of the workpiece during a critical machining operation. This is especially applicable to workpieces manufactured from certain lightweight metals and alloys, such as those including aluminum as a major constituent or component.

In accordance with the present invention, apparatus is provided for moving a workpiece into and out of a grinding or milling machine in such a way as to fully support the workpiece during critical times of its handling and during the period in which it is being machined by tools of the machine. The apparatus includes a workpiece holding unit mounted on a spindle head of the machine for rotation therewith during rotation of the workpiece relative to machining tools carried by the machine. A loading means for receiving the workpiece externally of the holding unit and for advancing the workpiece into the holding unit is secured to the holding unit itself so as to rotate therewith during a machining operation. The loading means includes a support frame for fully supporting the workpiece during its advancement into the holding unit along a first axis of movement, which may comprise, in one embodiment of the machine, a generally horizontal axis. A placement means is operatively associated with the loading means for subsequently moving the workpiece away from the support frame and along a second axis of movement, and this results in a placement of the workpiece in a precisely located position for being held while it receives a machining operation. In the embodiment of the machine in which the first axis of movement is horizontal, the second axis of movement is vertical, and movement of the workpiece is in an upward direction to its final placement position for machining. By moving the workpiece upwardly against supporting structures carried in the machining zone, it is possible to apply cooling liquid to the machined areas during machining operations to thereby wash away all particulate material resulting from the machining operation and to prevent overheating of the machined areas. Such cleansing and cooling are essential in precision grinding and milling of the type contemplated by the present invention.

In a specific embodiment of the invention, the loading means and workpiece holding unit constitute a single unit which is secured to a spindle head of the machine so that the workpiece can be received, held, and rotated relative to machining tools operatively associated with the machine. A support frame of the loading means includes a pair of support rods for supporting the load of the workpiece, and the holding unit is provided with tubular means for receiving and shielding the support rods from the machining environment into which the workpiece is advanced. The support frame of the loading means also includes a support plate having locating pins projecting upwardly therefrom for positioning a workpiece thereon during loading and unloading. The workpiece is lifted and lowered relative to the support frame, once it is in the confines of the unit, and a piston means carried within the spindle head of the machine comprises a means for lifting the workpiece away from the support frame of the loading means and into a precisely located final position determined by means carried within the holding unit. A second support frame is associated with the piston means of the spindle for lifting the workpiece away from the first support frame of the loading means. In this manner, a workpiece is provided with full and uniform support during its handling relative to a grinding or milling machine, and precise positioning and holding of the workpiece during grinding or milling is achieved.

These and other features and advantages of the present invention will be more fully appreciated from the detailed discussion which follows. In that discussion reference will be made to the accompanying drawings as briefly described below.

BRIEF DESCRIPTIONS OF DRAWINGS

DETAILED DESCRIPTION OF THE INVENTION

Figure 1:
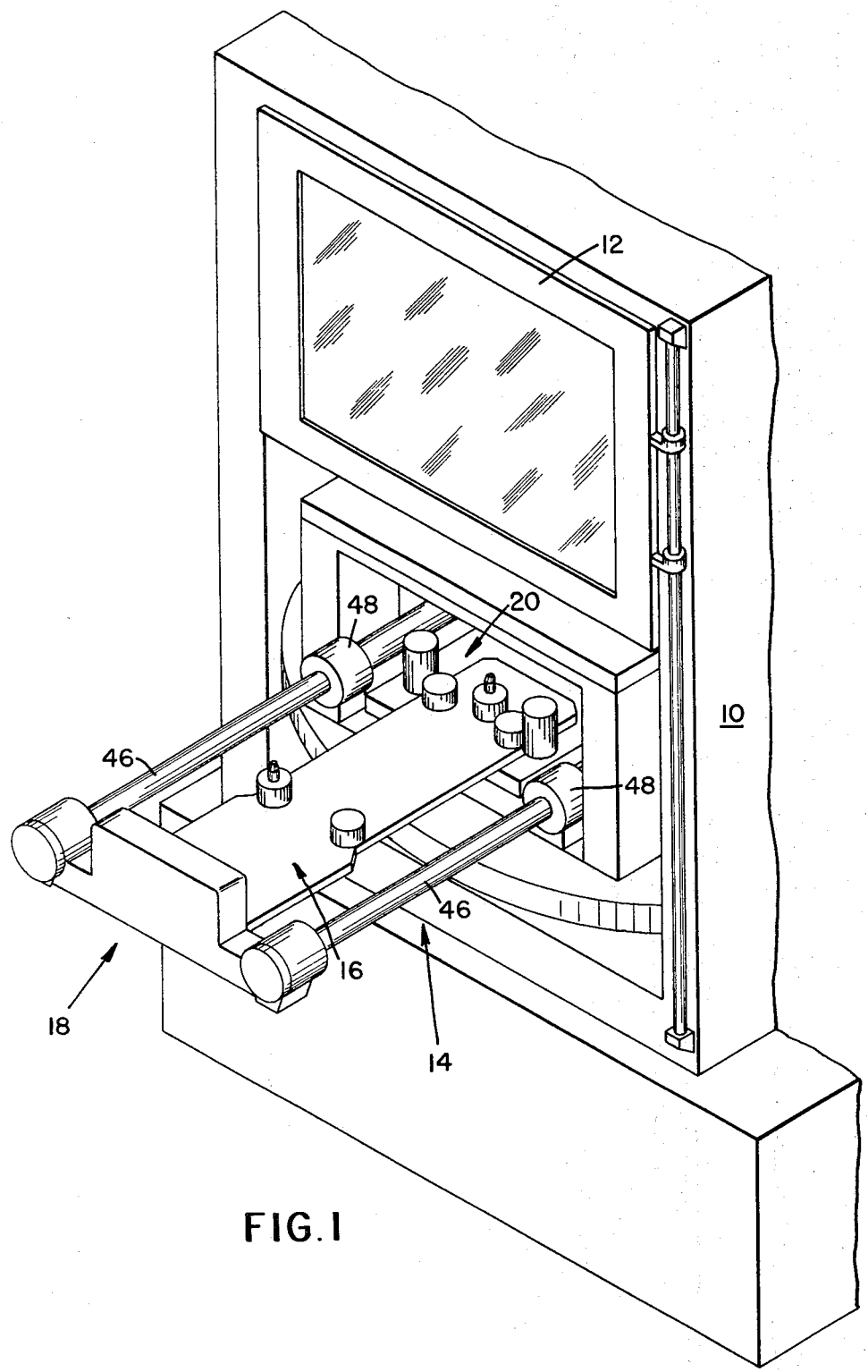
FIG. 1 is an isometric view of the apparatus of this invention as associated with a machine for grinding or milling a shaped cavity within a workpiece.

Referring to FIG. 1, the apparatus of the present invention is illustrated in a particular application in which it is used for handling rotary engine blocks with a machine 10 which performs a grinding or milling operation on cavity shapes formed in such blocks. The machine 10 may comprise either a grinding or milling machine having a spindle (not shown) located in its base portion for rotating a workpiece about a vertical axis after the workpiece is loaded and positioned within the machine. Suitable grinding or milling heads are also contained within the machine for contacting the workpiece during a work cycle of the machine. Typically, such machines provide for application of considerable quantities of coolant to the grinding or milling zone to prevent overheating of the workpiece and to wash away particulate material being removed therefrom, and therefore, it is necessary to provide a closure member 12 which can effectively close off the interior working zone of the machine from surrounding areas during machine operation.

The apparatus of the present invention comprises a device, generally indicated at 14, for loading, unloading, and holding a workpiece relative to the machine 10 which is to perform a machining operation on the workpiece. In the FIG. 1 view, the device is shown in a condition for receiving a workpiece on a support frame or plate 16, carried by a loading means 18, for advancing the workpiece into the confines of a holding unit 20 manually or by known mechanisms for effecting such movement, and once the loading means is advanced into the holding unit 20, it can be retained therein and rotated with the holding unit during a machining operation on the workpiece. The dimensions and positions of the loading means 18 and of the holding unit 20 are such that all of the structures of the apparatus of this invention can be contained within the working zone of the machine when the closure 12 is moved downwardly to a position for sealing off the working zone during machine operation.

Figure 2:
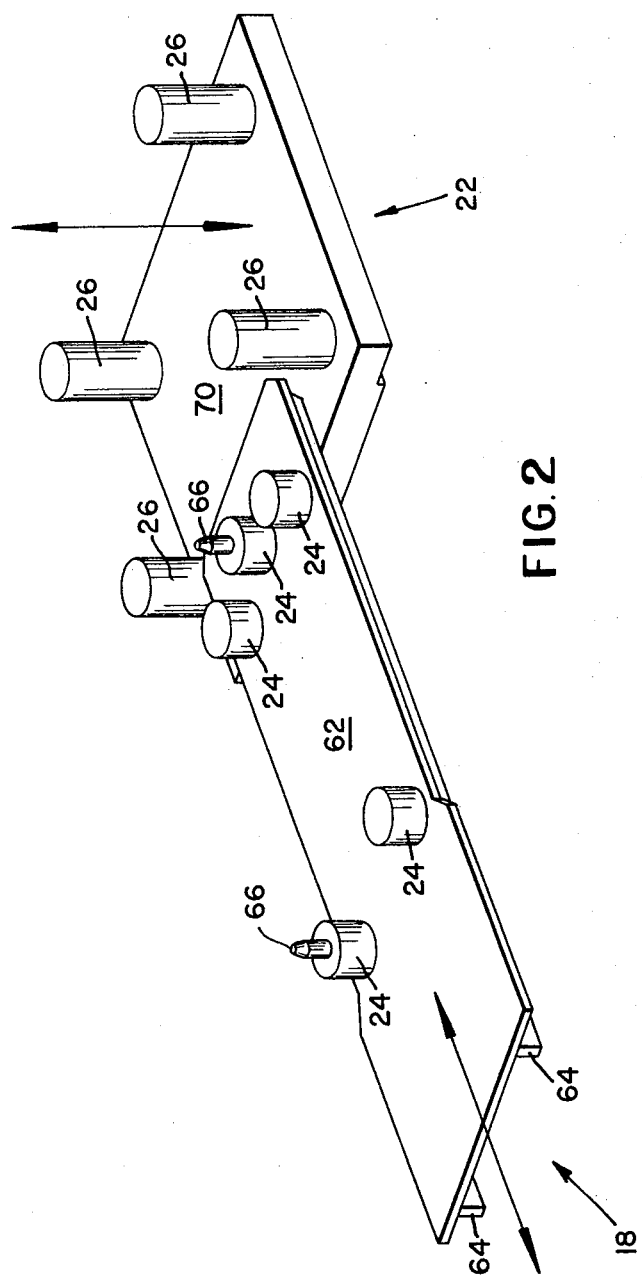
FIG. 2 is a schematic view showing basic components and motions involved in the operation of the apparatus of this invention.

FIG. 2 schematically illustrates the basic motions involved with certain components of the apparatus of this invention. As illustrated, the loading means 18 functions to move a workpiece along a first axis of movement into and out of a machining zone, and a placement means 22 functions to move the workpiece along a second axis of movement to and from a precisely located position within the machine for receiving a machining operation. Both the loading means 18 and the placement means 22 may be in the form of frames, plates, or other structures having means for contacting the workpiece during its movements into and out of a machining position within the work zone of the machine. Support pads 24 and 26 may be carried on the loading means and placement means, respectively, for fully supporting the workpiece during each of its directions of movement into the machine and into a final position for receiving a grinding or milling operation. In a specific embodiment of the invention, which will be discussed in greater detail below, the axis of movement for loading and unloading of a workpiece into and out of the machine is in a horizontal plane, and the axis of movement for placing the workpiece in a final position for machining is in a vertical plane. Preferably, the workpiece is moved horizontally into the confines of the machine, and then it is lifted to its final and precisely located position for receiving a machining operation. By lifting the workpiece upwardly to a final position, it is possible to maintain a better cleansing of all support structures during the machining operation. Cleansing is accomplished with the same liquid as is used for cooling the grinding or milling zone.

Figure 3:
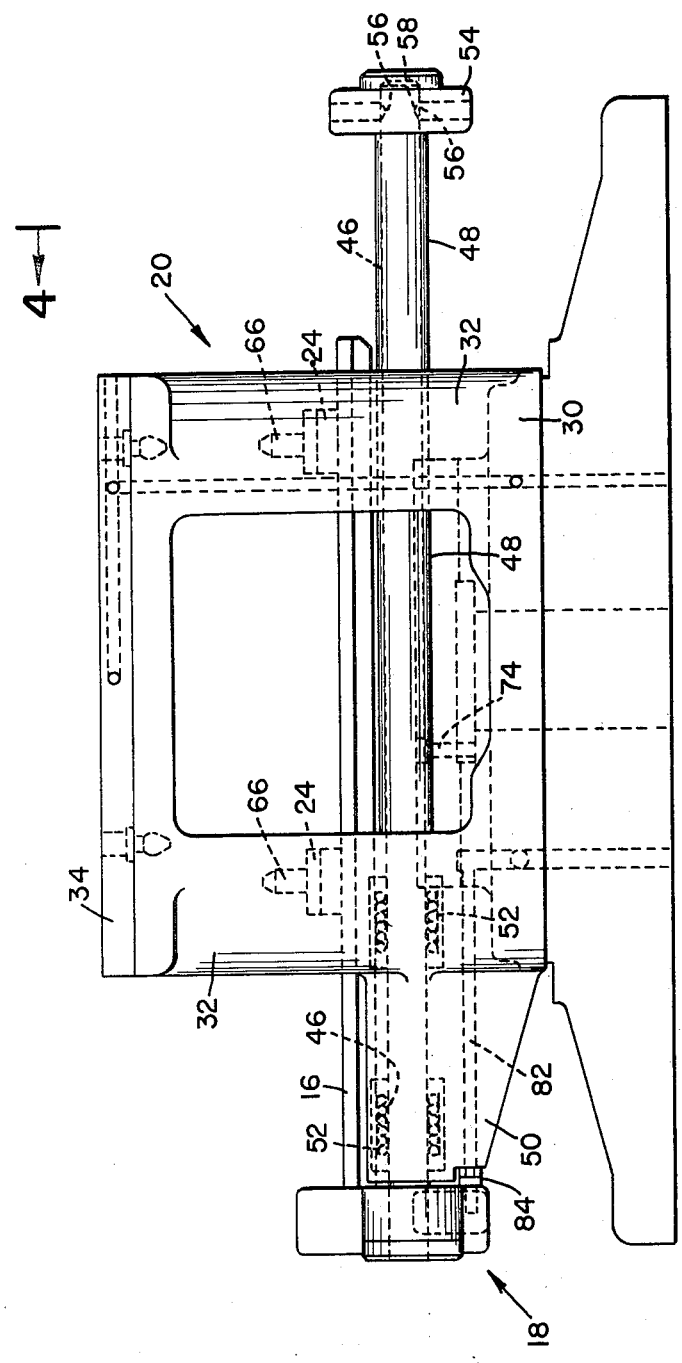
FIG. 3 is a side elevational view, partly in section, of a specific embodiment of the invention.
Figure 4:
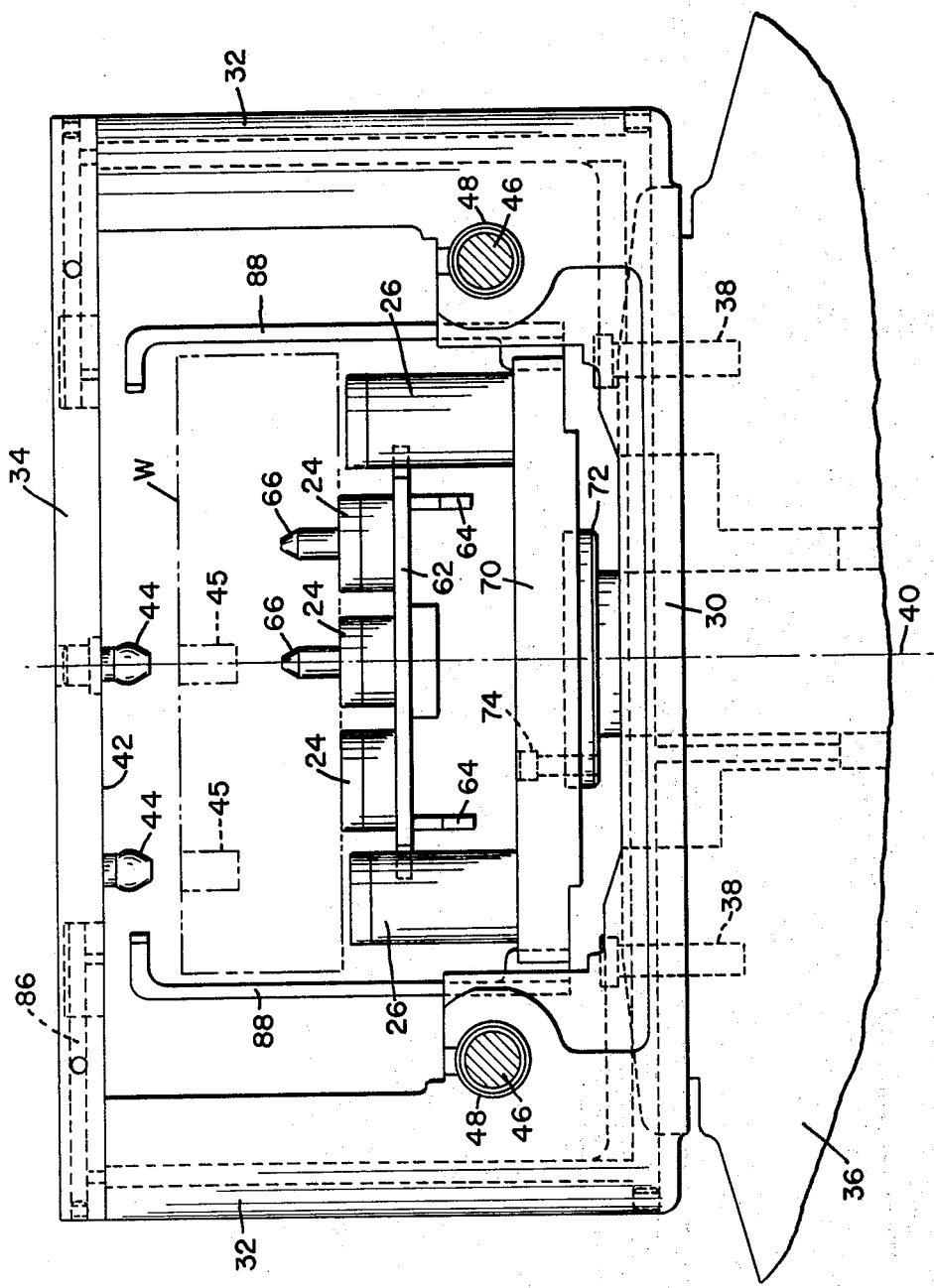
FIG. 4 is an end elevational view, partly in section, of the embodiment illustrated in FIG. 3, as seen from 4—4 thereof.
Figure 5:
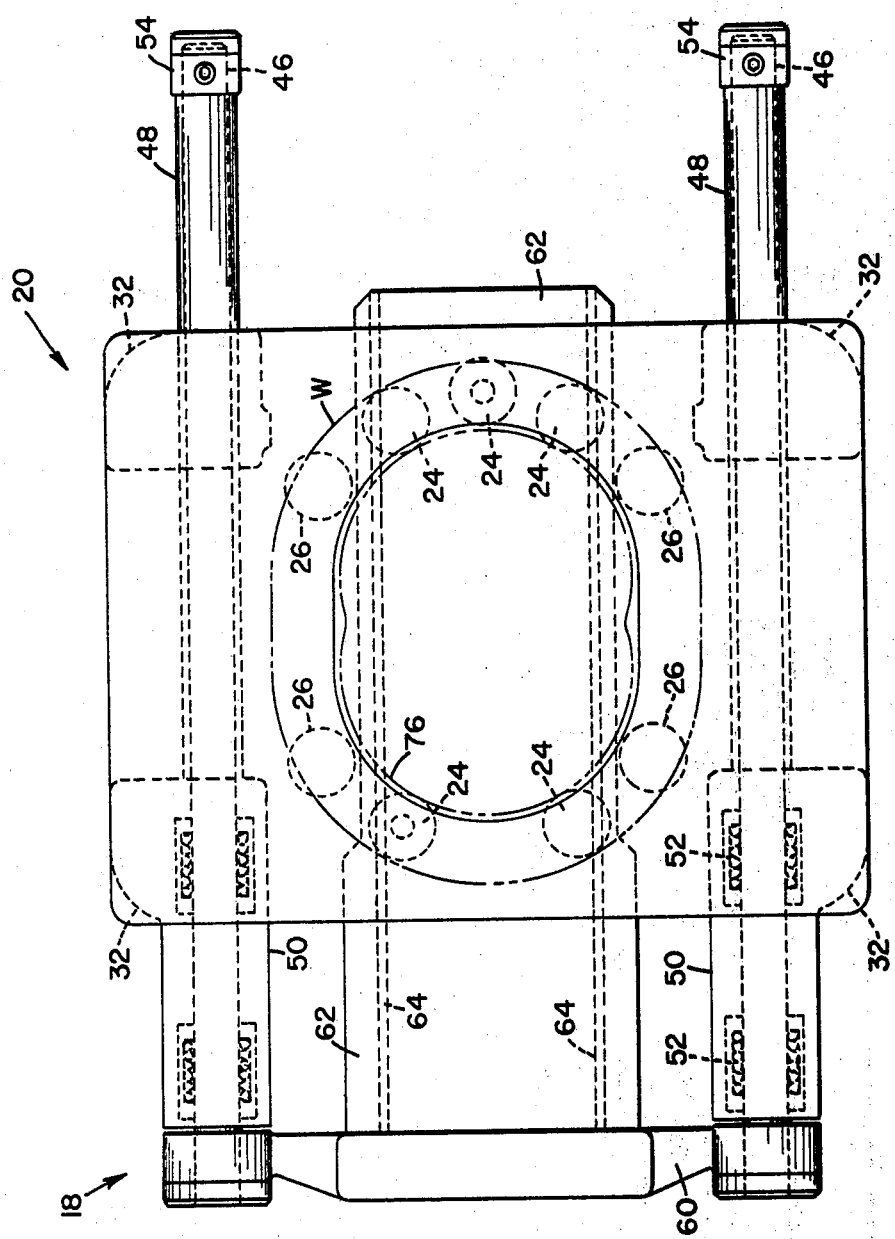
FIG. 5 is a top plan view of the specific embodiment of FIGS. 3 and 4, drawn in the same scale as FIG. 4.

FIGS. 3–5 illustrate details of a specific embodiment of the invention. This embodiment includes the same basic components and motions as described above with reference to FIGS. 1 and 2. As illustrated, the loading means 18 comprises a frame-like structure which can be received into the holding unit 20 so that a workpiece, designated W, can be advanced into and out of a working zone defined within the holding unit 20. The holding unit 20 is designed in the form of a relatively open cage which can support the loading means 18 and workpiece carried thereon and which allows entry of working tools and coolant liquids into and around the workpiece while it is being held in a precisely located final position within the holding unit. Generally, the holding unit comprises a base structure 30, four upright post structures 32 located at the corners of the base structure, and a top frame structure 34 for receiving a workpiece in a final position for a milling or grinding operation. The base structure 30 may comprise an assembly of elements or a single integral structure which can be secured to a spindle head assembly 36 of the machine 10. Suitable fastening devices, such as bolts 38, provide for a securement of the base structure of the holding unit to the spindle head assembly. With this arrangement, the entire holding unit and all of its contained structures rotate about a vertical axis 40 of the spindle head assembly when the machine is operated. The upright post members 32 may be formed integrally with portions of the base structure assembly or may comprise separate elements secured to the base structure 30 and to the top frame structure 34. The top frame structure 34 includes a supporting surface 42 and precisely located guiding pins 44 for receiving an upper surface of the workpiece W when the workpiece is moved upwardly into a firmly seated position against the surface 42. This position comprises the final, and precisely located, position for applying a machining treatment to the workpiece within the machine 10. The top frame structure 32 is open in its center area to provide for a downward movement of grinding or milling tools into the workpiece in its finally seated position, and the entire holding unit 20 is sufficiently open to prevent free passage and flow of a coolant liquid onto the surfaces being machined. Circulation of the coolant liquid into the machining zone and to a filtering tank carries with it particulate material being removed from the workpiece, and this maintains a necessary cleansing of all structures in the machining zone during a machine operation.

The loading means 18 is operatively associated with the holding unit 20 by the fact that a pair of support rod means 46 of the loading means 18 pass through a corresponding pair of tubular elements 48 mounted between upright post members 32 of the holding unit 20. This basic relationship can be appreciated from the FIG. 1 view as well as from the detailed illustrations of FIGS. 3–5. In FIGS. 3–5, the loading means 18 is shown in its inwardmost position for placing a workpiece within the confines of the holding unit 20. A workpiece is removed from the holding unit 20 by drawing the loading means 18 outwardly (toward the left) from the position illustrated in FIGS. 3–5. Support rod means 46 are designed to carry the load of the loading unit 18 and any contained workpiece during loading and unloading operations of the workpiece relative to the holding unit 20. The tubular elements 48 function to receive and guide the support rods 46 and to protect the lubricated surfaces of the support rods from the machining environment (including liquid coolant and particulate material being removed in the machining zone) during operation of the machine. During such operation the loading means is allowed to remain in its full inward position and rotates with the holding unit 20 and the spindle head of the machine. The tubular elements 48 include extended portions 50 on the loading side of the unit for containing bearing structures 52 at the load bearing end of the loading means 18. Opposite terminal ends of the tubular elements 48 are provided with locking means 54 in the form of end cap structures on the ends of the tubular elements 48 for receiving and locking free ends of the support rods 46 which slide back and forth within the fixed tubular elements 48. Spring urged balls 56 are included in the end cap structures to form a releasable locking relationship with a groove formation 58 at the terminal end of each support rod 46. Thus, when the loading means 18 has been advanced to a full inward position for loading a workpiece within the holding unit 20, the ends of the support rods 46 of the loading means are received into a latching relationship with the locking means 54 of the tubular elements 48 to maintain the loading unit in position during a working cycle. The loading means can be pulled outwardly by merely applying sufficient pressure to draw the support rods 46 outwardly away from the locking means 54 of end cap structures when it is time to unload the machine at the end of a cycle.

At the loading end of the loading means 18, a crossbar member 60 provides for a rigid spacing of the two support rods 46 and functions to carry a support plate 16 which constitutes a supporting structure for carrying the load of a workpiece as the workpiece is loaded into and out of the confines of the holding unit 20. The support plate 16 is secured only at its end which contacts the crossbar member 60, and includes a pair of spaced bracing elements 64 which add sufficient rigidity to the unit to prevent unwanted deflection under the load of a workpiece. The basic structure of the support plate 16 of the loading means 18 is schematically illustrated in FIG. 2.

As previously discussed a number of support pads 24 are provided on the support plate 62 for fully supporting the load of the workpiece during loading and unloading operations. Five such support pads are illustrated in the embodiment of FIGS. 3–5, although a greater or lesser number may be used for specific forms or shapes of workpieces. Two or more of the support pads 24 are provided with upwardly extending locating pins 66 which are received into corresponding holes formed into the workpiece for establishing a correct orientation of the workpiece on the loading means 18. Upper surfaces of the support pads 24 may comprise a layer of rubber or other resilient material which prevents damage to the workpiece as it is loaded onto the loading means and advanced into the machine.

Once the workpiece W is loaded into the confines of the holding unit 20 by a sliding movement of the loading means 18 toward the interior of the machine, a placement means 22 operates to lift the workpiece from the support pads 24 of the loading means and to firmly position the workpiece against the surface 42 defined on the top frame structure of the holding unit 20. The placement means 22 may comprise any suitable separate support frame, or equivalent structure, for contacting portions of the workpiece held on the holding unit so as to lift the workpiece upwardly therefrom without further movement of the loading means 18. This is accomplished by providing a second support plate 70 with supporting pads 26 which can by-pass the side margins of the first support plate 16 to thereby contact and lift the workpiece away from the support pads 24 of the loading means 18 as the second support plate 70 is lifted. This relationship can be seen in the FIGS. 2 and 4 illustrations. The support plate 70 is lifted by direct contact from a piston member 72 mounted for reciprocation on a vertical axis in the spindle 36 of the machine. As shown in FIGS. 3 and 4, the piston member 72 is secured to the support plate 70 with screw members 74. When the support plate 70 is lifted, the workpiece is lifted upwardly away from the support pads 24 of the loading means until an upper limit position is reached against the surface 42. The workpiece is provided with precisely dimensioned and positioned holes 45 for receiving the guiding pins 44 of the supporting surface 42. As the workpiece moves into engagement with the guiding pins 44 a very precise placement of the workpiece is achieved. Lifting of the workpiece is accomplished with combined pressure of a spring member and hydraulic system (not shown) which urge the piston 72 upwardly, and lowering of the workpiece is accomplished through an application of hydraulic pressure to the piston member 72 in a downward direction to overcome the force of the just-mentioned spring member. Thus, when a workpiece has been loaded into the confines of the holding unit 20, hydraulic pressure is regulated to allow a lifting of the workpiece to its upper limit position by the action of the spring member the hydraulic fluid urging against a bottom surface of the piston 72. When the workpiece has reached its upper limit position within the holding unit 20, the machine is closed and started for a work cycle which brings a grinding or milling tool into contact with an inner cavity surface 76 (see FIG. 5) of the workpiece. During machining, a known coolant liquid is supplied to the areas being machined, and the liquid washes downwardly through the machining zone to a collection point where it can be transferred to a filter system for recycling. When the machining operation is completed, the machine can be opened, and a hydraulic circuit activated to lower the workpiece by applying fluid pressure to the piston member 72. As the workpiece is lowered, its bottom surface comes to rest on the upper surfaces of the support pads 24 of the loading means 18, and an operator can withdraw the machined workpiece from the working zone by pulling outwardly on the crossbar member 60 of the loading means 18. Then, the finished workpiece can be removed and an unfinished piece replaced onto the loading means 18 for a subsequent machining cycle.

In addition to the details discussed above, the device of this invention may be provided with certain additional structures to assist in a safe and positive positioning of a workpiece in the confines of the machine 10. For example, an air line 82 (see FIG. 3) may be connected to a source of compressed air to indicate a full seating position of the loading means 18 when a blocking element 84 closes off an open end port of the air line 82. This type of system is known per se and can be tied into machine operations to prevent a start-up of the machine until full seating has been accomplished. Likewise, an air line 86 may communicate with a port located in the top frame structure 34 of the holding unit to detect final positioning of the workpiece when the upper surface of the workpiece closes off the open port of the air line 86. The air line 86 is tied to machine functions to prevent machine start-up until a final positioning of the workpiece has been achieved. Extractor elements 88 are not necessarily required for an unseating of a workpiece from its upper limit position, but may be provided to apply a downward force on the workpiece as the support plate 70 is lowered to remove the workpiece from its final positioning for machining. In addition, the support pads 26 may be provided with resilient (rubber or other suitable material) top surfaces or may be provided with spring-loaded inserts for pressing against the bottom surface of a workpiece.

Having described the structural features of a specific embodiment of the apparatus of this invention, it can be appreciated that substitutions of fully equivalent structures can be made in devices of this type to accomplish the same relative movement of a workpiece into and out of a machine and into a final machining position therein. Such equivalent substitutions are intended to be included within the scope of protection defined in the claims which follow.

What is claimed is:

1. Apparatus for loading, unloading, and holding a workpiece relative to a machine which performs a machining operation on the workpiece, comprising
    a workpiece holding unit carried by said machine for receiving and holding a workpiece in a precisely located position relative to machining tools of the machine, said holding unit being mounted on a spindle head of said machine for rotation with rotational movement of the spindle head relative to the machining tools of the machine during a machining operation,
    loading means for receiving a workpiece externally of said holding unit and for advancing the workpiece into the holding unit where the workpiece can be held in said precisely located position, said loading means having a support frame for fully supporting the workpiece during advancement into the holding unit, and including means for moving said support frame into and out of the holding unit along a generally horizontal axis of movement, said loading means being secured to said holding unit for rotation therewith, and
    placement means operatively associated with said loading means for moving said workpiece away from said support frame and along a second axis of movement within said holding unit for final placement of the workpiece in said precisely located position for receiving a machining operation.

2. Apparatus according to claim 1 wherein said first axis of movement for said support frame is a generally horizontal axis and wherein said second axis of movement for the workpiece is a generally vertical axis.

3. Apparatus according to claim 1 wherein said loading means includes support rod means for supporting the load of the workpiece and wherein said holding unit carries tubular means for receiving said support rod means and for protecting the support rod means from the machining environment during a machining operation.

4. Apparatus according to claim 1 wherein said support frame of said loading means includes a support plate having locating pins projecting upwardly therefrom for positioning said workpiece on the support plate during loading and unloading.

5. Apparatus according to claim 3, and including means for locking said loading means when a workpiece has been advanced into said holding unit.

6. Apparatus according to claim 5 wherein said means for locking comprises means for receiving free end portions of said support rod means when the workpiece has been fully advanced into the holding unit.

7. Apparatus according to claim 1 wherein said placement means includes a second support frame for lifting and lowering a workpiece to and from said precisely located position.

8. Apparatus according to claim 7 wherein said means for lifting includes a spring means which assists in urging said second support frame upwardly to establish said precisely located position of a workpiece carried by the second support frame.

9. Apparatus according to claim 7, and including locating means within said holding unit for receiving said workpiece and for fixing the final position thereof when the workpiece is lifted to its precisely located position for receiving a machining operation.

10. Apparatus according to claim 7 wherein said workpiece is lowered from its precisely located position by hydraulic means.

11. Apparatus according to claim 7 wherein said second support frame is provided with resilient surface areas for contacting and carrying the load of the workpiece.

12. Apparatus according to claim 11 wherein said resilient surface areas include spring mounted pads for contacting the workpiece.

* * * * *